United States Patent
Wei et al.

(10) Patent No.: US 10,516,873 B2
(45) Date of Patent: Dec. 24, 2019

(54) DEPTH IMAGING DEVICE AND DRIVING METHOD THEREOF

(71) Applicants: LITE-ON ELECTRONICS (GUANGZHOU) LIMITED, Guangzhou (CN); Lite-On Technology Corporation, Taipei (TW)

(72) Inventors: Shou-Te Wei, Taipei (TW); Hsing-Hung Chen, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 206 days.

(21) Appl. No.: 15/866,446

(22) Filed: Jan. 9, 2018

(65) Prior Publication Data

US 2019/0174118 A1   Jun. 6, 2019

(30) Foreign Application Priority Data

Dec. 5, 2017   (CN) .......................... 2017 1 1264915

(51) Int. Cl.
| | |
|---|---|
| *H04N 13/239* | (2018.01) |
| *G06T 7/593* | (2017.01) |
| *H04N 13/254* | (2018.01) |
| *H04N 13/271* | (2018.01) |
| *H04N 13/00* | (2018.01) |

(52) U.S. Cl.
CPC .......... *H04N 13/239* (2018.05); *G06T 7/593* (2017.01); *H04N 13/254* (2018.05); *H04N 13/271* (2018.05); *G06T 2207/10028* (2013.01); *H04N 2013/0081* (2013.01)

(58) Field of Classification Search
CPC .......... G06T 2207/10028; G06T 7/521; G06T 7/593; H04N 13/239; H04N 13/254; H04N 13/271; H04N 2013/0081
See application file for complete search history.

(56) References Cited

U.S. PATENT DOCUMENTS

| | | | |
|---|---|---|---|
| 2016/0050407 A1* | 2/2016 | Chen | H04N 5/23212 348/47 |
| 2016/0212411 A1* | 7/2016 | Lindner | G01C 11/00 |
| 2016/0330434 A1* | 11/2016 | Chen | G01B 11/2513 |
| 2017/0264884 A1* | 9/2017 | Chou | H04N 13/128 |
| 2017/0366802 A1* | 12/2017 | Hirasawa | G03B 17/12 |
| 2018/0293749 A1* | 10/2018 | Lee | G06T 7/596 |
| 2019/0253638 A1* | 8/2019 | Wen | G01B 11/245 |

* cited by examiner

*Primary Examiner* — Mohammed S Rahaman
(74) *Attorney, Agent, or Firm* — JCIPRNET

(57) ABSTRACT

A depth imaging device is provided. A first camera and a second camera form a first depth imaging system. A projection element and a second camera form a second depth imaging system. The control unit is configured to instruct one of the first and second depth imaging systems to acquire a depth map and a confidence map, and determine whether each of confidence values in the confidence map is less than a confidence threshold value. If each of the confidence values is less than the confidence threshold value, then the control unit turns on the other of the first and second depth imaging systems. If at least one of the confidence values is not less the confidence threshold value, then the control unit determines whether a closest distance in the depth map falls within a predetermined range or not. A driving method of a depth imaging device is also provided.

14 Claims, 4 Drawing Sheets

DEPTH IMAGING DEVICE AND DRIVING METHOD THEREOF

CROSS-REFERENCE TO RELATED APPLICATION

This application claims the priority benefit of China application serial no. 201711264915.3, filed on Dec. 5, 2017. The entirety of the above-mentioned patent application is hereby incorporated by reference herein and made a part of this specification.

BACKGROUND OF THE INVENTION

Field of the Invention

The invention relates to an imaging device and a driving method thereof, and particularly relates to a depth imaging device and a driving method thereof.

Description of Related Art

Along with increasing demand on depth information of objects, a technique of accurately detecting object surface also becomes more and more important. Particularly, detection of objects at different distances is more demanding, for example, an unmanned aerial vehicle, an aerial camera or a sweeping robot, etc.

At present, main measurement methods for obtaining depth information of objects are binocular vision, and structured light, etc. The binocular vision refers to that the parallax generated by two eyes is used for measuring a three-dimensional structure of an object through a triangulation measurement, which has advantages of high efficiency, simple system structure, low cost, etc. The structured light is to project a patterned light surface to an object, where light patterns with different depths may be deformed, and then the depth information of the object is obtained through the triangulation measurement. However, both of the depth measurement methods have a situation of a blind zone in a particular area of a field of vision, and when the object is appeared in the blind zone, a related device cannot determine a distance of the object, which affects the safety of the device, and at the present stage where battery may only store a limited amount of electricity, how to mitigate the limitation of unable to measure the blind zone and maintain a system power-saving effect is an important effect to be achieved by present depth imaging device.

SUMMARY OF THE INVENTION

The invention is directed to a depth imaging device, which has a reduced visual blind zone and a power-saving effect.

The invention is directed to a driving method for a depth imaging device, which implements an effect of a reduced visual blind zone and a power-saving effect.

An embodiment of the invention provides a depth imaging device including a first camera, a second camera, a projection element and a control unit. The first camera and the second camera form a first depth imaging system. The projection element and the second camera form a second depth imaging system, wherein a distance between the projection element and the second camera is not equal to a distance between the first camera and the second camera. The control unit is electrically connected to the first camera, the second camera and the projection element, and is configured to instruct one of the first depth imaging system and the second depth imaging system to acquire a depth map and a confidence map corresponding to the depth map, and determine whether each of confidence values in the confidence map is smaller than a confidence threshold value. If each of the confidence values is smaller than the confidence threshold value, the control unit turns on the other one of the first depth imaging system and the second depth imaging system. If at least one of the confidence values is not smaller than the confidence threshold value, the control unit determines whether a closest distance in the depth map falls within a predetermined range. If the closest distance falls within the predetermined range, the control unit does not turn on the other one of the first depth imaging system and the second depth imaging system. If the closest distance is not within the predetermined range, the control unit turns on the other one of the first depth imaging system and the second depth imaging system.

In an embodiment of the invention, the control unit is configured to instruct the first depth imaging system to acquire the depth map and the confidence map corresponding to the depth map, and determine whether each of the confidence values in the confidence map is smaller than the confidence threshold value. If each of the confidence values is smaller than the confidence threshold value, the control unit turns on the second depth imaging system. If at least one of the confidence values is not smaller than the confidence threshold value, the control unit determines whether the closest distance in the depth map falls within the predetermined range, wherein the predetermined range is that the closest distance is greater than or equal to a distance threshold value. If the closest distance falls within the predetermined range, the control unit does not turn on the second depth imaging system, and if the closest distance is not within the predetermined range, the control unit turns on the second depth imaging system and the projection element.

In an embodiment of the invention, the control unit is configured to instruct the second depth imaging system to acquire the depth map and the confidence map corresponding to the depth map, and determine whether each of the confidence values in the confidence map is smaller than the confidence threshold value. If each of the confidence values is smaller than the confidence threshold value, the control unit turns off the projection element and turns on the first depth imaging system. If at least one of the confidence values is not smaller than the confidence threshold value, the control unit determines whether the closest distance in the depth map falls within the predetermined range, wherein the predetermined range is that the closest distance is smaller than or equal to a distance threshold value. If the closest distance falls within the predetermined range, the control unit does not turn on the first depth imaging system, and if the closest distance is not within the predetermined range, the control unit turns off the projection element and turns on the first depth imaging system.

In an embodiment of the invention, the projection element is configured to project a structured light.

An embodiment of the invention provides a driving method for a depth imaging device, which includes: (a) instructing one of a first depth imaging system and a second depth imaging system to acquire a depth map and a confidence map corresponding to the depth map, wherein a first camera and a second camera form the first depth imaging system, and a projection element and the second camera form the second depth imaging system, and a distance between the projection element and the second camera is not equal to a distance between the first camera and the second camera; and (b) determining whether each of confidence values in the confidence map is smaller than a confidence threshold value, if each of the confidence values is smaller than the confidence threshold value, turning on the other one of the first depth imaging system and the second depth imaging system, and if at least one of the confidence values is not smaller than the confidence threshold value, determining whether a closest distance in the depth map falls within a predetermined range, if the closest distance falls within the predetermined range, not turning on the other one of the first depth imaging system and the second depth imaging system, and if the closest distance is not within the predetermined range, turning on the other one of the first depth imaging system and the second depth imaging system.

In an embodiment of the invention, the step (a) includes instructing the first depth imaging system to acquire the depth map and the confidence map corresponding to the depth map, and the step (b) includes determining whether each of the confidence values in the confidence map is smaller than the confidence threshold value, if each of the confidence values is smaller than the confidence threshold value, turning on the second depth imaging system, if at least one of the confidence values is not smaller than the confidence threshold value, determining whether the closest distance in the depth map falls within the predetermined range, wherein the predetermined range is that the closest distance is greater than or equal to a distance threshold value, if the closest distance falls within the predetermined range, not to turn on the second depth imaging system, and if the closest distance is not within the predetermined range, turning on the second depth imaging system and the projection element.

In an embodiment of the invention, the step (a) includes instructing the second depth imaging system to acquire the depth map and the confidence map corresponding to the depth map, and the step (b) includes determining whether each of the confidence values in the confidence map is smaller than the confidence threshold value, if each of the confidence values is smaller than the confidence threshold value, turning off the projection element and turning on the first depth imaging system, if at least one of the confidence values is not smaller than the confidence threshold value, determining whether the closest distance in the depth map falls within the predetermined range, wherein the predetermined range is that the closest distance is smaller than or equal to a distance threshold value, if the closest distance falls within the predetermined range, not to turn on the first depth imaging system, and if the closest distance is not within the predetermined range, turning off the projection element and turning on the first depth imaging system.

In an embodiment of the invention, the distance between the projection element and the second camera is smaller than the distance between the first camera and the second camera.

In an embodiment of the invention, the first camera, the projection element and the second camera are arranged on a straight line.

In an embodiment of the invention, when the second depth imaging system is turned on, the projection element is instructed to project a structured light.

According to the above description, in the depth imaging device and the driving method thereof, by setting the confidence threshold value and the distance threshold value in the predetermined range, the depth imaging device is adapted to switch the executed depth imaging system according to the distance between the object and the device itself, so as to reduce a range of a visual blind zone and achieve a power-saving effect.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
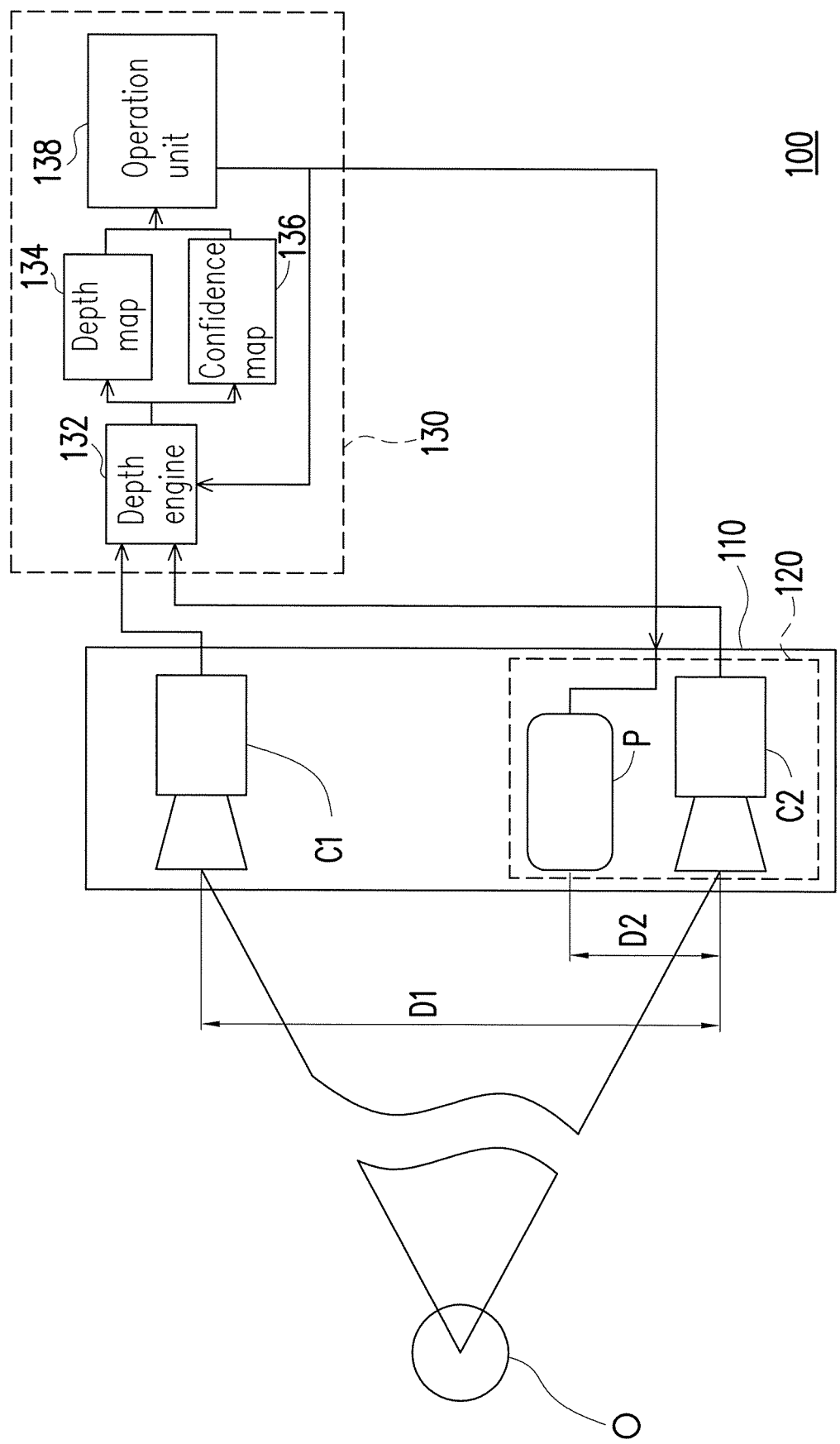
FIG. 1A is a schematic diagram of a depth imaging device turning on a first depth imaging system according to an embodiment of the invention.
Figure 2A:
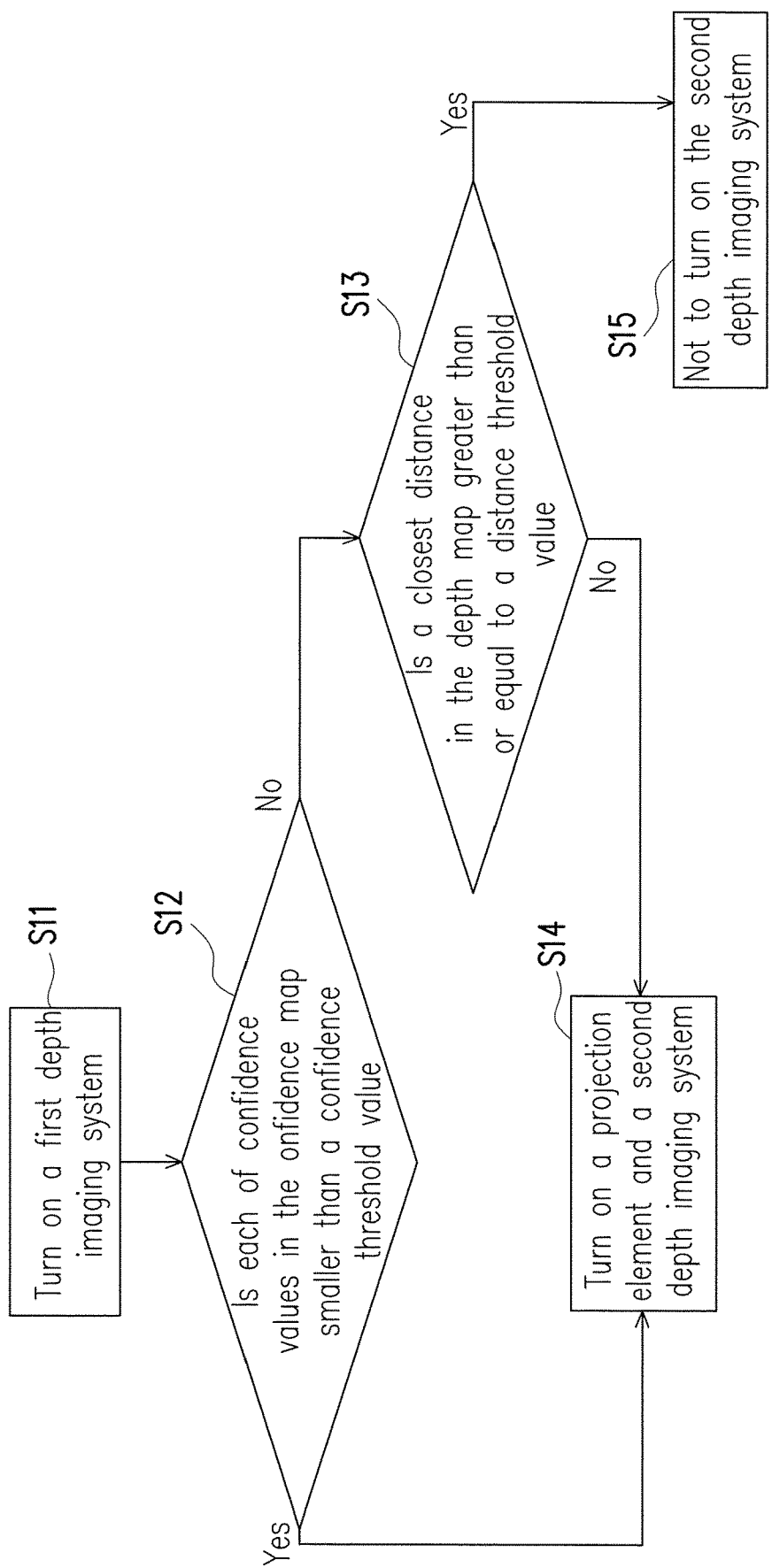
FIG. 2A is a flowchart illustrating a driving method of the depth imaging device of FIG. 1A.

FIG. 1A is a schematic diagram of a depth imaging device turning on a first depth imaging system according to an embodiment of the invention. FIG. 2A is a flowchart illustrating a driving method of the depth imaging device of FIG. 1A.

Referring to FIG. 1A, in the present embodiment, the depth imaging device 100 includes a first camera C1, a second camera C2, a projection element P and a control unit 130. For example, in the present embodiment, the first camera C1 and the second camera C2 may be digital cameras having a photo-sensing element such as a charge-coupled device (CCD) or a complementary metal-oxide-semiconductor (CMOS), etc., where types of the first camera C1 and the second camera C2 may be the same or different. However, the invention is not limited thereto. In the present embodiment, the projection element P may be any projection element capable of projecting a structured light.

In the present embodiment, the first camera C1 and the second camera C2 form a first depth imaging system 110, and the projection element P and the second camera C2 form a second depth imaging system 120, where a distance D2 between the projection element P and the second camera C2 is not equal to a distance D1 between the first camera C1 and the second camera C2. In the present embodiment, the distance D2 between the projection element P and the second camera C2 is smaller than the distance D1 between the first camera C1 and the second camera C2. However, the invention is not limited thereto, and in other embodiments, the distance D2 between the projection element P and the second camera C2 may be greater than the distance D1 between the first camera C1 and the second camera C2. In the present embodiment, the first camera C1, the second camera C2 and the projection element P are arranged on a straight line. In the present embodiment, the control unit 130 is electrically connected to the first camera C1, the second camera C2 and the projection element P, and includes a depth engine 132 and an operation unit 138.

In the present embodiment, the control unit 130 instructs the first depth imaging system 110 to acquire a depth map 134 of an object O and a confidence map 136 corresponding to the depth map 134. To be specific, the first depth imaging system 110 acquires two images of different angles based on a parallax phenomenon between the first camera C1 and the second camera C2, and the depth engine 132 of the control unit 130 performs image processing to the images obtained by the first camera C1 and the second camera C2 to obtain the depth map 134 of the object O through, for example, a triangulation method, and calculates the confidence map 136 corresponding to the depth map 134 of the object O through an algorithm (for example, a depth algorithm) well known by those skilled in the art. The depth map 134 may include a depth value of each of pixel points in the image, where the depth value is, for example, a distance between a subject and the depth imaging device 100, and the confidence map 136 includes confidence values of the depth values calculated for each of the pixel points. For example, the higher the confidence value corresponding to one pixel is, the more reliable and more accurate the calculated depth value of the pixel is. Comparatively, the lower the confidence value corresponding to one pixel is, the more unreliable and more inaccurate the calculated depth value of the pixel is.

The control unit 130 is configured to instruct one of the first depth imaging system 110 and the second depth imaging system 120 to acquire the depth map 134 and the confidence map 136 corresponding to the depth map 134, and determine whether each of the confidence values in the confidence map 136 is smaller than a confidence threshold value. If each of the confidence values is smaller than the confidence threshold value, the control unit 130 turns on the other one of the first depth imaging system 110 and the second depth imaging system 120. If at least one of the confidence values is not smaller than the confidence threshold value, the control unit 130 determines whether a closest distance in the depth map 134 falls within a predetermined range. If the closest distance falls within the predetermined range, the control unit 130 does not turn on the other one of the first depth imaging system 110 and the second depth imaging system 120. If the closest distance is not within the predetermined range, the control unit 130 turns on the other one of the first depth imaging system 110 and the second depth imaging system 120. Referring to FIG. 1A and FIG. 2A, in the present embodiment, the operation unit 138 of the control unit 130 turns on the first depth imaging system 110 (corresponding to step S11 of FIG. 2A), and the operation unit 138 determines whether each of the confidence values in the confidence map 136 is smaller than the confidence threshold value (corresponding to step S12 of FIG. 2A). If each of the confidence values is smaller than the confidence threshold value, the operation unit 138 turns on the projection element P and the second depth imaging system 120 (corresponding to step S14 of FIG. 2A). If at least one of the confidence values is not smaller than the confidence threshold value, the operation unit 138 determines whether the closest distance in the depth map 134 falls within the predetermined range (corresponding to step S13 of FIG. 2A). In the present embodiment, the predetermined range is that the closest distance is greater than or equal to a distance threshold value. If the closest distance falls within the predetermined range, the operation unit 138 does not turn on the second depth imaging system 120 (corresponding to step S15 of FIG. 2A). If the closest distance is not within the predetermined range, the operation unit 138 turns on the projection element P and the second depth imaging system 120 (corresponding to step S14 of FIG. 2A). In detail, when the operation unit 138 determines that it is required to turn on the projection element P and the second depth imaging system 120, the operation unit 138 instructs the projection element P to project a structured light, and meanwhile the operation unit 138 transmits an electric signal to the depth engine 132 to instruct the depth engine 132 to start acquiring the depth map 134 and the confidence map 136 of the second depth imaging system 120.

Figure 1B:
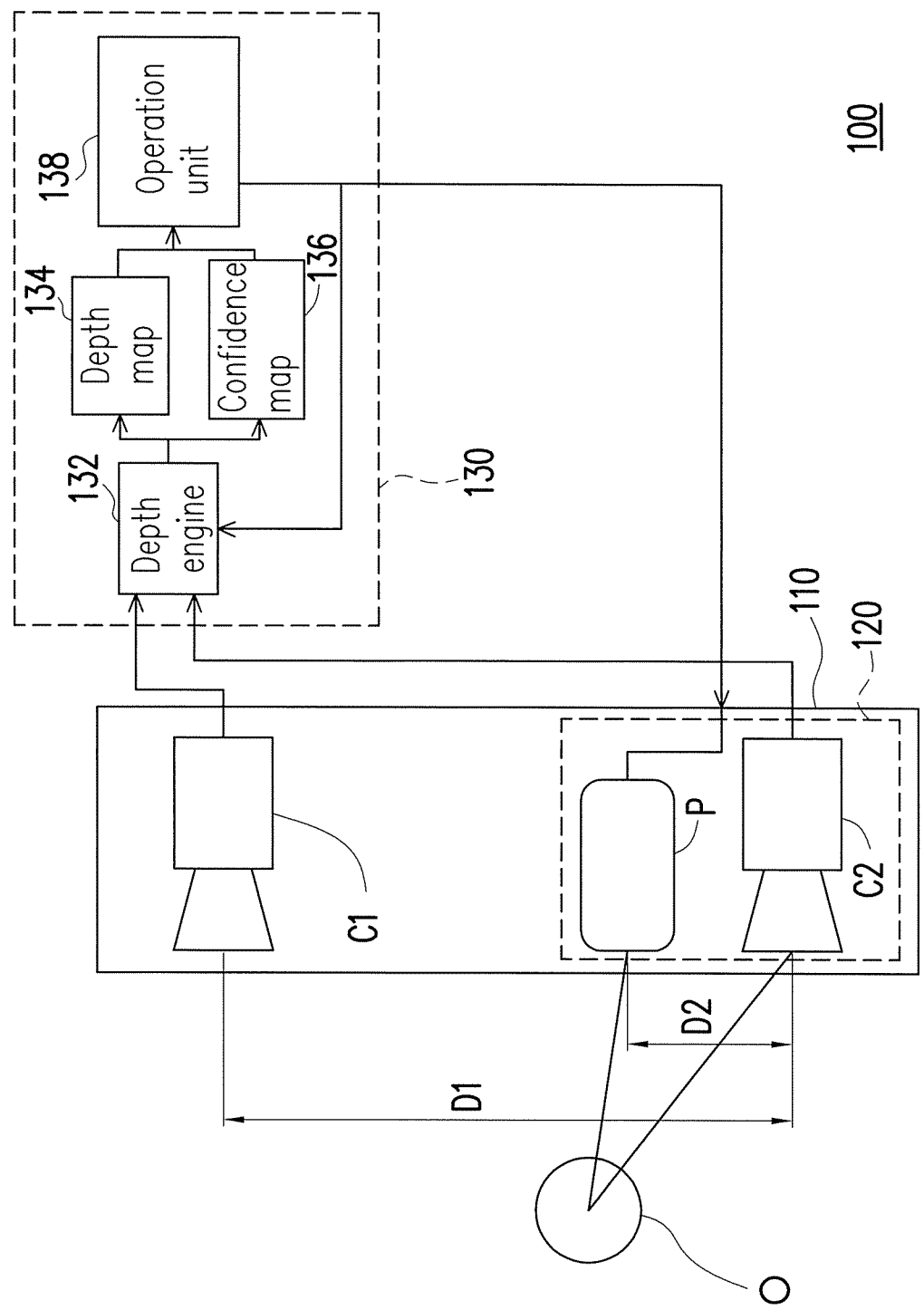
FIG. 1B is a schematic diagram of the depth imaging device of FIG. 1A turning on a second depth imaging system.
Figure 2B:
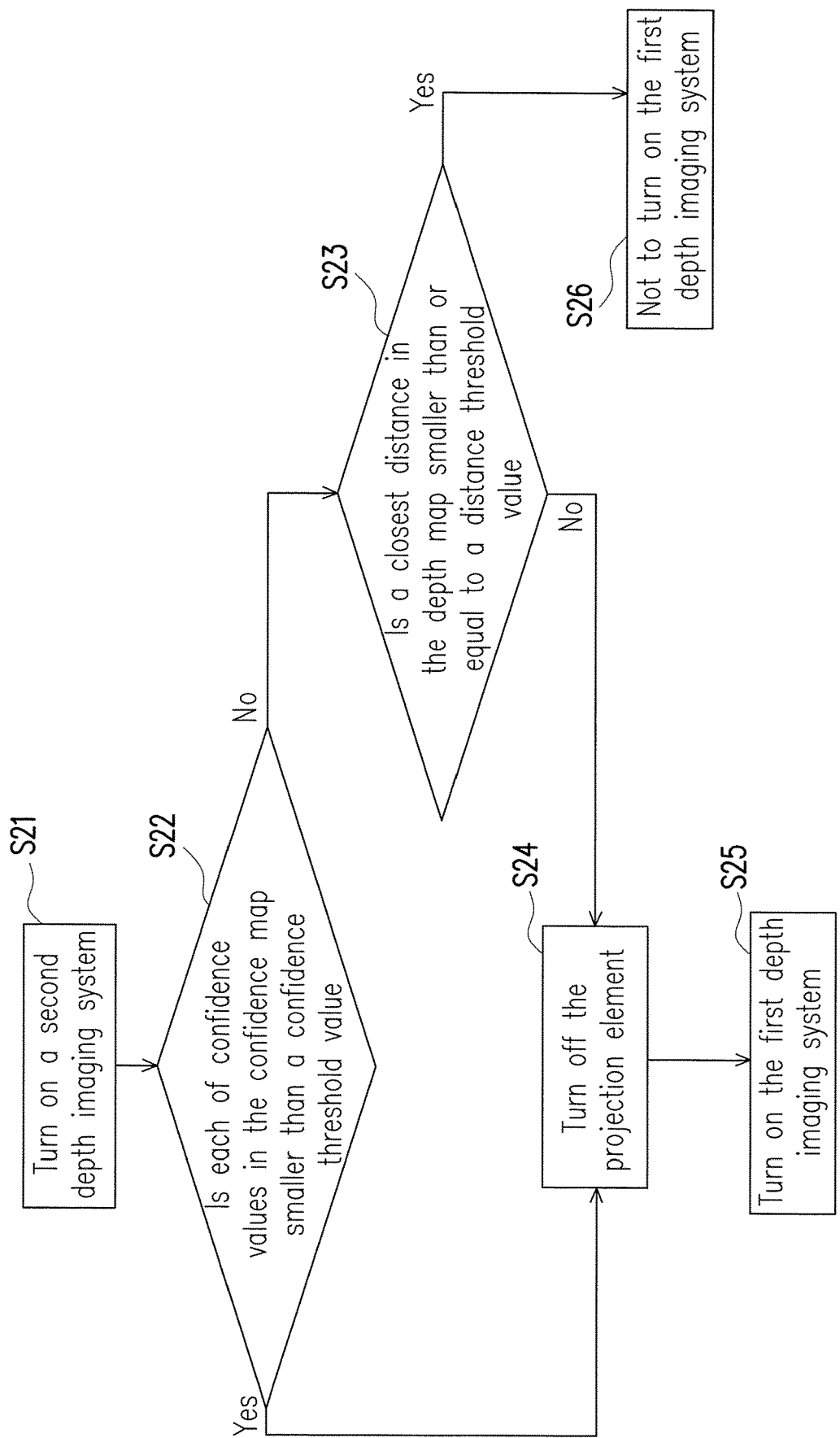
FIG. 2B is a flowchart illustrating a driving method of the depth imaging device of FIG. 1B.

FIG. 1B is a schematic diagram of the depth imaging device of FIG. 1A turning on the second depth imaging system. FIG. 2B is a flowchart illustrating a driving method of the depth imaging device of FIG. 1B. Referring to FIG. 1B, in the present embodiment, compared to a position of the object O of FIG. 1A, a position of the object O of FIG. 1B is closer to the depth imaging device 100. In the present embodiment, the control unit 130 instructs the second depth imaging system 120 to obtain the depth map 134 of the object O and the confidence map 136 corresponding to the depth map 134. In the present embodiment, the projection element P is configured to project a structured light. To be specific, the second depth imaging system 120 calculates depth values of the object O through a patterned light spot projected on the object O by the projection element P. The second camera C2 obtains an image of the patterned light spot reflected by the object O, and obtains the depth map 134 of the object O through the triangulation method, and calculates the confidence map 136 corresponding to the depth map 134 of the object O through an algorithm (for example, a depth algorithm) well known by those skilled in the art.

Referring to FIG. 1B and FIG. 2B, in the present embodiment, the operation unit 138 of the control unit 130 turns on the second depth imaging system 120 (corresponding to step S21 of FIG. 2B), and then the operation unit 138 determines whether each of the confidence values in the confidence map 136 is smaller than the confidence threshold value (corresponding to step S22 of FIG. 2B). If each of the confidence values is smaller than the confidence threshold value, the operation unit 138 turns off the projection element P (corresponding to step S24 of FIG. 2B) and turns on the first depth imaging system 110 (corresponding to step S25 of FIG. 2B). If at least one of the confidence values is not smaller than the confidence threshold value, the operation unit 138 determines whether the closest distance in the depth map 134 falls within the predetermined range (corresponding to step S23 of FIG. 2B), and in the present embodiment, the predetermined range is that the closest distance is smaller than or equal to a distance threshold value. If the closest distance falls within the predetermined range, the operation unit 138 does not turn on the first depth imaging system 110 (corresponding to step S26 of FIG. 2B), and if the closest distance is not within the predetermined range, the operation unit 138 turns off the projection element P (corresponding to step S24 of FIG. 2B) and turns on the first depth imaging system 110 (corresponding to step S25 of FIG. 2B). In detail, when the operation unit 138 determines that it is required to turn off the projection element P, the operation unit 138 transmits an electric signal to the depth engine 132 to instruct the depth engine 132 to stop acquiring the depth map 134 and the confidence map 136 of the second depth imaging system 120.

In the present embodiment, the control unit 130 is not limited to first instruct the first depth imaging system 110 to acquire the depth map 134 of the object O and the confidence map 136 corresponding to the depth map 134, but may first instruct the second depth imaging system 120 to acquire the depth map 134 of the object O and the confidence map 136 corresponding to the depth map 134. In the present embodiment, the confidence threshold value of the step S12 of FIG. 2A may be equal to or not equal to the confidence threshold value of the step S22 of FIG. 2B. In the present embodiment, the distance threshold value of the step S13 of FIG. 2A may be equal to or not equal to the distance threshold value of the step S23 of FIG. 2B.

In an embodiment, the control unit 130, the depth engine 132 and the operation unit 138 are, for example, central processing units (CPU), microprocessors, digital signal processors (DSP), programmable controllers, programmable logic devices (PLD), or other similar devices or a combination of these devices, which are not limited by the invention. Moreover, in an embodiment, various functions of the control unit 130, the depth engine 132 and the operation unit 138 may be implemented as a plurality of program codes. The program codes may be stored in a memory, and the control unit 130, the depth engine 132 and the operation unit 138 may execute these program codes. Alternatively, in an embodiment, various functions of the control unit 130, the depth engine 132 and the operation unit 138 may be implemented as one or a plurality of circuits. It is not limited to use a software or hardware manner to implement the various functions of the control unit 130, the depth engine 132 and the operation unit 138.

In summary, the depth imaging device and the driving method thereof of the embodiment of the invention have two depth imaging systems, and one is used for detecting depth information of objects located far away, and the other is used for detecting depth information of objects with closer distance, and even if the object falls in a blind zone of one of the depth imaging systems, the other depth imaging system may still be used to detect the depth information of the object, so as to achieve an effect of detecting distance information of the object in real-time to effectively reduce the visual blind zone. Moreover, through collaboration of the two depth imaging systems, it is avoided to simultaneously use the two depth imaging systems when detecting the object to cause more power consumption, so that a power-saving effect is achieved. Moreover, in the depth imaging device according to the embodiments of the invention, two cameras may be adopted, and the control unit 130 may be implemented by a two-way-input integrated chip, so as to reduce the cost of an image processing chip.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A depth imaging device, comprising:
a first camera;
a second camera, wherein the first camera and the second camera form a first depth imaging system;
a projection element, wherein the projection element and the second camera form a second depth imaging system, wherein a distance between the projection element and the second camera is not equal to a distance between the first camera and the second camera; and
a controller, electrically connected to the first camera, the second camera and the projection element, wherein the controller is configured to instruct one of the first depth imaging system and the second depth imaging system to acquire a depth map and a confidence map corresponding to the depth map, and determine whether each of confidence values in the confidence map is smaller than a confidence threshold value for one of the first depth imaging system and the second depth imaging system, in response to determining that each of the confidence values is smaller than the confidence threshold value for one of the first depth imaging system and the second depth imaging system, the controller turns on the other one of the first depth imaging system and the second depth imaging system, in response to determining that at least one of the confidence values is not smaller than the confidence threshold value, the controller determines whether a closest distance in the depth map falls within a predetermined range, in response to determining that the closest distance falls within the predetermined range, the controller does not turn on the other one of the first depth imaging system and the second depth imaging system, and in response to determining that the closest distance is not within the predetermined range, the controller turns on the other one of the first depth imaging system and the second depth imaging system.

2. The depth imaging device as claimed in claim 1, wherein the controller is configured to instruct the first depth imaging system to acquire the depth map and the confidence map corresponding to the depth map, and determine whether each of the confidence values in the confidence map is smaller than the confidence threshold value, if each of the confidence values is smaller than the confidence threshold value, the controller turns on the second depth imaging system, and if at least one of the confidence values is not smaller than the confidence threshold value, the controller determines whether the closest distance in the depth map falls within the predetermined range, wherein the predetermined range is that the closest distance is greater than or equal to a distance threshold value, if the closest distance falls within the predetermined range, the controller does not turn on the second depth imaging system, and if the closest distance is not within the predetermined range, the controller turns on the second depth imaging system and the projection element.

3. The depth imaging device as claimed in claim 2, wherein the distance between the projection element and the second camera is smaller than the distance between the first camera and the second camera.

4. The depth imaging device as claimed in claim 1, wherein the controller is configured to instruct the second depth imaging system to acquire the depth map and the confidence map corresponding to the depth map, and determine whether each of the confidence values in the confidence map is smaller than the confidence threshold value, if each of the confidence values is smaller than the confidence threshold value, the controller turns off the projection element and turns on the first depth imaging system, and if at least one of the confidence values is not smaller than the confidence threshold value, the controller determines whether the closest distance in the depth map falls within the predetermined range, wherein the predetermined range is that the closest distance is smaller than or equal to a distance threshold value, if the closest distance falls within the predetermined range, the controller does not turn on the first depth imaging system, and if the closest distance is not within the predetermined range, the controller turns off the projection element and turns on the first depth imaging system.

5. The depth imaging device as claimed in claim 4, wherein the distance between the projection element and the second camera is smaller than the distance between the first camera and the second camera.

6. The depth imaging device as claimed in claim 1, wherein the first camera, the projection element and the second camera are arranged on a straight line.

7. The depth imaging device as claimed in claim 1, wherein the projection element is configured to project a structured light.

8. A driving method for a depth imaging device, comprising:
(a) instructing one of a first depth imaging system and a second depth imaging system to acquire a depth map and a confidence map corresponding to the depth map, wherein a first camera and a second camera form the first depth imaging system, and a projection element and the second camera form the second depth imaging system, and a distance between the projection element and the second camera is not equal to a distance between the first camera and the second camera; and
(b) determining whether each of confidence values in the confidence map is smaller than a confidence threshold value for one of the first depth imaging system and the second depth imaging system, in response to determining that each of the confidence values is smaller than the confidence threshold value for one of the first depth imaging system and the second depth imaging system, turning on the other one of the first depth imaging system and the second depth imaging system, and in response to determining that at least one of the confidence values is not smaller than the confidence threshold value, determining whether a closest distance in the depth map falls within a predetermined range, in response to determining that the closest distance falls within the predetermined range, not turning on the other one of the first depth imaging system and the second depth imaging system, and in response to determining that the closest distance is not within the predetermined range, turning on the other one of the first depth imaging system and the second depth imaging system,
wherein the driving method is capable of performing each of the above steps.

9. The driving method for the depth imaging device as claimed in claim 8, wherein the step (a) comprises instructing the first depth imaging system to acquire the depth map and the confidence map corresponding to the depth map, and the step (b) comprises determining whether each of the confidence values in the confidence map is smaller than the confidence threshold value, if each of the confidence values is smaller than the confidence threshold value, turning on the second depth imaging system, if at least one of the confidence values is not smaller than the confidence threshold value, determining whether the closest distance in the depth map falls within the predetermined range, wherein the predetermined range is that the closest distance is greater than or equal to a distance threshold value, if the closest distance falls within the predetermined range, not turning on the second depth imaging system, and if the closest distance is not within the predetermined range, turning on the second depth imaging system and the projection element.

10. The driving method for the depth imaging device as claimed in claim 9, wherein the distance between the projection element and the second camera is smaller than the distance between the first camera and the second camera.

11. The driving method for the depth imaging device as claimed in claim 8, wherein the step (a) comprises instructing the second depth imaging system to acquire the depth map and the confidence map corresponding to the depth map, and the step (b) comprises determining whether each of the confidence values in the confidence map is smaller than the confidence threshold value, if each of the confidence values is smaller than the confidence threshold value, turning off the projection element and turning on the first depth imaging system, if at least one of the confidence values is not smaller than the confidence threshold value, determining whether the closest distance in the depth map falls within the predetermined range, wherein the predetermined range is that the closest distance is smaller than or equal to a distance threshold value, if the closest distance falls within the predetermined range, not turning on the first depth imaging system, and if the closest distance is not within the predetermined range, turning off the projection element and turning on the first depth imaging system.

12. The driving method for the depth imaging device as claimed in claim 11, wherein the distance between the projection element and the second camera is smaller than the distance between the first camera and the second camera.

13. The driving method for the depth imaging device as claimed in claim 8, wherein the first camera, the projection element and the second camera are arranged on a straight line.

14. The driving method for the depth imaging device as claimed in claim 8, wherein when the second depth imaging system is turned on, the projection element is instructed to project a structured light.

* * * * *